United States Patent [19]

van Lengerich

[11] Patent Number: 4,957,042

[45] Date of Patent: * Sep. 18, 1990

[54] EXTRUDER AND CONTINUOUS MIXER ARRANGEMENT FOR PRODUCING AN AT LEAST PARTIALLY BAKED PRODUCT HAVING A COOKIE-LIKE CRUMB STRUCTURE INCLUDING A POST-EXTRUSION MICROWAVE DEVICE

[75] Inventor: Bernhard H. van Lengerich, Ringwood, N.J.

[73] Assignee: Nabisco Brands, Inc., East Hanover, N.J.

[ * ] Notice: The portion of the term of this patent subsequent to Jul. 3, 2007 has been disclaimed.

[21] Appl. No.: 362,620

[22] Filed: Jun. 7, 1989

[51] Int. Cl.$^5$ .......................... A21C 3/04; A47J 27/12; A23P 1/00
[52] U.S. Cl. ......................... 99/353; 99/348; 99/355; 99/451; 99/483; 366/85; 366/291
[58] Field of Search .................. 99/331, 348, 352, 353, 99/355, 357, 426, 443 C, 451, 467, 483, 484, 450.1; 366/83–86, 291; 425/200, 209, 131.1

[56] References Cited

U.S. PATENT DOCUMENTS

| | | | |
|---|---|---|---|
| 1,625,022 | 4/1927 | Fousek . | |
| 2,120,138 | 6/1938 | Mathews et al. | 99/81 |
| 2,183,693 | 12/1939 | Rasch | 107/14 |
| 2,488,046 | 11/1949 | Werner et al. | 107/29 |
| 2,582,542 | 1/1952 | Hein | 107/29 |
| 2,838,012 | 6/1958 | Weidenmiller et al. | 107/29 |
| 2,838,013 | 6/1958 | Weidenmiller et al. | 107/29 |
| 3,021,220 | 2/1962 | Going et al. | 99/92 |
| 3,064,589 | 11/1962 | Genich | 107/29 |
| 3,158,486 | 11/1964 | Mork et al. | 99/86 |
| 3,195,868 | 7/1965 | Loomans et al. | 366/85 |
| 3,215,094 | 11/1965 | Oldershaw et al. | 107/54 |
| 3,275,449 | 9/1966 | Fritzberg | 99/80 |
| 3,393,074 | 7/1968 | Ehrlich | 99/92 |
| 3,458,321 | 7/1969 | Reinhart | 99/80 |
| 3,462,276 | 8/1969 | Benson | 99/81 |
| 3,480,445 | 11/1969 | Slaybaugh | 99/83 |
| 3,490,750 | 1/1970 | Brennan, Jr. | 366/291 |
| 3,492,127 | 1/1970 | Ketch et al. | 99/86 |
| 3,615,675 | 10/1971 | Wisdom | 99/83 |
| 3,682,652 | 8/1972 | Corbin et al. | 99/83 |
| 3,692,535 | 9/1972 | Norsby | 99/92 |
| 3,732,109 | 5/1973 | Poat et al. | 99/83 |
| 3,753,729 | 8/1973 | Harms et al. | 99/82 |
| 3,767,421 | 10/1973 | Gulstad et al. | 426/154 |
| 3,767,422 | 10/1973 | Levitz | 426/152 |
| 3,769,034 | 10/1973 | Dreier, Jr. et al. | 426/151 |

(List continued on next page.)

Primary Examiner—Timothy F. Simone

[57] ABSTRACT

An extruder and continuous mixing apparatus operating to continuously mix, at least partially bake and extrude a preselected formulation of ingredients to provide an at least partially baked output product which, upon final baking, exhibits a cookie-like crumb structure with structural integrity. The extruder includes at least one screw-type element which is rotatably arranged in the extruder to vigorously mix and convey at least certain ingredients of the preselected formulation, including flour and oil, input through a feed port means at the upstream end of the extruder, wherein the total water content, by weight, of the ingredients is less than a preselected amount. A temperature control means operates to heat treat the ingredients during the vigorous mixing and conveyance by the screw-type element. The vigorous mixing and heat treatment is applied to the ingredients for substantially the entire length of the extruder. A continuous mixing apparatus is coupled to an output of the extruder to receive the heat treated ingredients at an upstream inlet. A source of water is coupled to the upstream inlet of the continuous mixing apparatus to add a preselected amount of water to the heat treated ingredients to increase the water content and modify the consistency of the ingredients after heat treatment and vigorous mixing and conveying. The continuous mixing apparatus is arranged for a gentle mixing and conveyance of the heat treated ingredients and added water. In addition, a microwave device is coupled to the downstream end of the continuous mixing apparatus to leaven, brown and final bake the output products.

18 Claims, 5 Drawing Sheets

U.S. PATENT DOCUMENTS

| | | | |
|---|---|---|---|
| 3,861,287 | 1/1975 | Manser | 99/348 |
| 3,908,025 | 9/1975 | Miller et al. | 426/623 |
| 3,922,369 | 11/1975 | Glicksman et al. | 426/548 |
| 3,987,207 | 10/1976 | Spaeti et al. | 426/99 |
| 4,020,187 | 4/1977 | McCulloch et al. | 426/72 |
| 4,038,481 | 7/1977 | Antrim et al. | 536/56 |
| 4,039,168 | 8/1977 | Caris et al. | 259/9 |
| 4,044,159 | 8/1977 | Lutz | 426/302 |
| 4,044,661 | 8/1977 | Balaz | 99/355 |
| 4,099,455 | 7/1978 | Wenger et al. | 99/483 |
| 4,104,463 | 8/1978 | Antrim et al. | 536/56 |
| 4,126,710 | 11/1978 | Jaworshi et al. | 426/589 |
| 4,128,051 | 12/1978 | Hildebolt | 99/348 |
| 4,190,410 | 2/1980 | Rhodes | 425/239 |
| 4,217,083 | 8/1980 | Machuque | 425/198 |
| 4,218,480 | 8/1980 | Dyson et al. | 426/19 |
| 4,219,580 | 8/1980 | Torres | 426/549 |
| 4,225,630 | 9/1980 | Pitchon | 426/623 |
| 4,239,906 | 12/1980 | Antrim et al. | 536/56 |
| 4,245,552 | 1/1981 | Small et al. | 99/483 |
| 4,277,464 | 7/1981 | Rewssner et al. | 424/177 |
| 4,285,271 | 8/1981 | Falck et al. | 99/353 |
| 4,318,931 | 3/1982 | Schiffman et al. | 426/243 |
| 4,322,202 | 3/1982 | Martinez | 425/208 |
| 4,344,975 | 8/1982 | Seiler | 426/285 |
| 4,350,713 | 9/1982 | Dyson et al. | 426/243 |
| 4,379,171 | 4/1983 | Furda et al. | 426/291 |
| 4,394,395 | 7/1983 | Rostagno et al. | 426/285 |
| 4,418,088 | 11/1983 | Cantenot | 426/549 |
| 4,431,674 | 2/1984 | Fulger et al. | 426/18 |
| 4,438,146 | 3/1984 | Colby et al. | 426/448 |
| 4,454,804 | 6/1984 | McCulloch | 425/208 |
| 4,455,333 | 6/1984 | Hong et al. | 426/94 |
| 4,465,447 | 8/1984 | Cheigh et al. | 425/72 |
| 4,465,452 | 8/1984 | Masuzawa | 425/308 |
| 4,478,857 | 10/1983 | Stauss | 426/72 |
| 4,492,250 | 1/1985 | Levine | 425/142 |
| 4,497,850 | 2/1985 | Gould et al. | 426/560 |
| 4,500,558 | 2/1985 | Fulger et al. | 426/463 |
| 4,503,080 | 3/1985 | Brabbs et al. | 426/94 |
| 4,563,358 | 1/1986 | Mercer et al. | 426/89 |
| 4,568,550 | 2/1986 | Fulger et al. | 426/19 |
| 4,568,551 | 2/1986 | Seewi et al. | 426/99 |
| 4,618,499 | 10/1986 | Wainwright | 426/283 |
| 4,650,685 | 3/1987 | Persson et al. | 426/285 |
| 4,661,360 | 4/1987 | Smith | 426/94 |
| 4,664,921 | 5/1987 | Seiden | 426/94 |
| 4,668,519 | 5/1987 | Dartey et al. | 426/548 |
| 4,685,878 | 8/1987 | Pinto | 425/202 |
| 4,693,899 | 9/1987 | Hong et al. | 426/94 |
| 4,741,264 | 5/1988 | McPeak | 99/483 |
| 4,752,484 | 6/1988 | Pflaumer et al. | 426/94 |
| 4,756,921 | 7/1988 | Calandro et al. | 426/560 |
| 4,762,723 | 8/1988 | Strong | 426/283 |
| 4,764,388 | 8/1988 | Sullivan et al. | 426/311 |
| 4,770,890 | 9/1988 | Giddey et al. | 426/549 |
| 4,771,915 | 9/1988 | Cand et al. | 222/56 |
| 4,777,057 | 10/1988 | Sugisawa et al. | 426/412 |
| 4,778,690 | 10/1988 | Sadel, Jr. et al. | 426/560 |
| 4,786,514 | 11/1988 | Wiedmann | 426/231 |
| 4,844,937 | 7/1989 | Wilkinson et al. | 426/559 |
| 4,844,938 | 7/1989 | Amamoto et al. | 426/589 |
| 4,851,247 | 7/1989 | Greenhouse et al. | 426/250 |

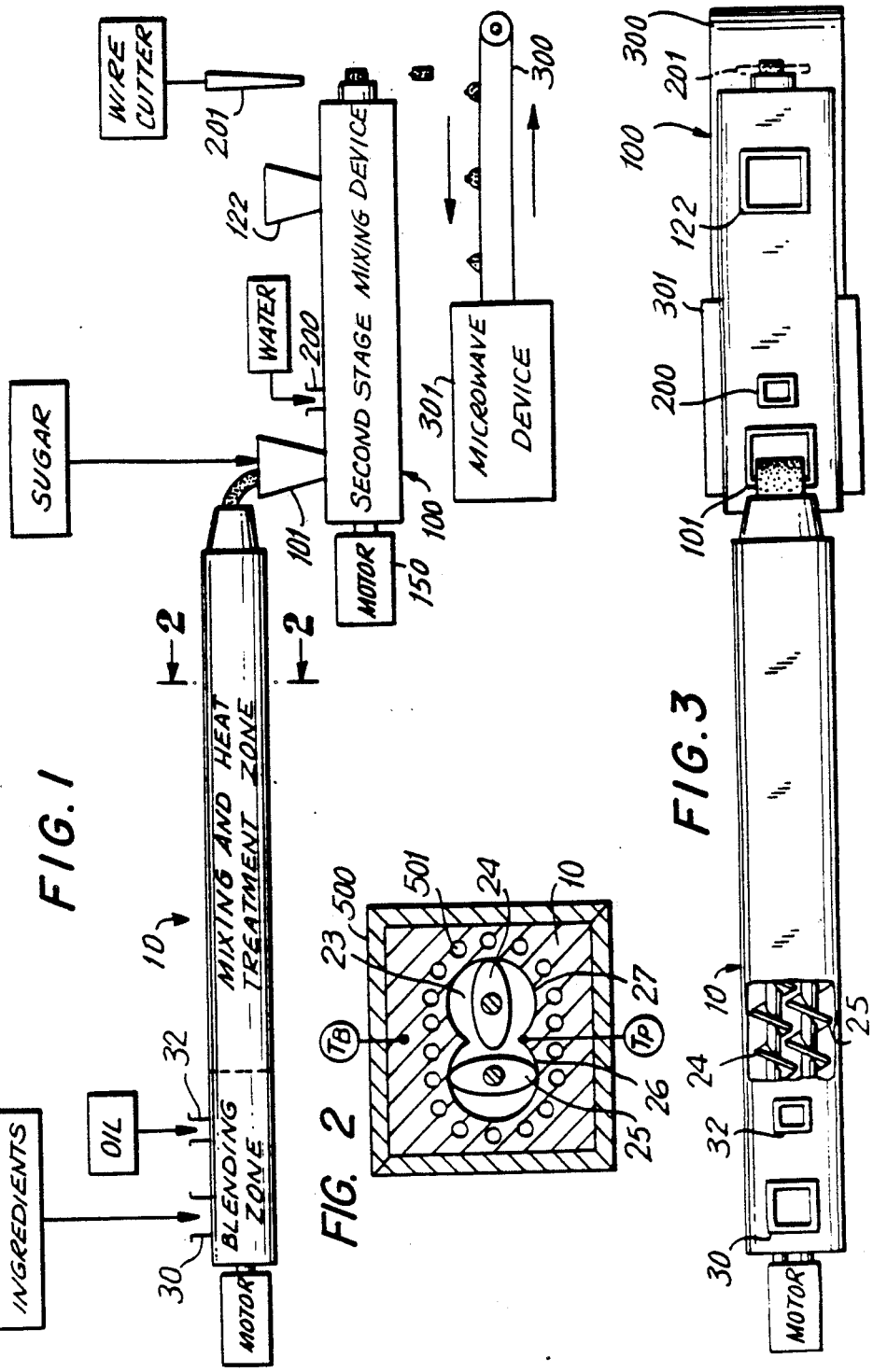

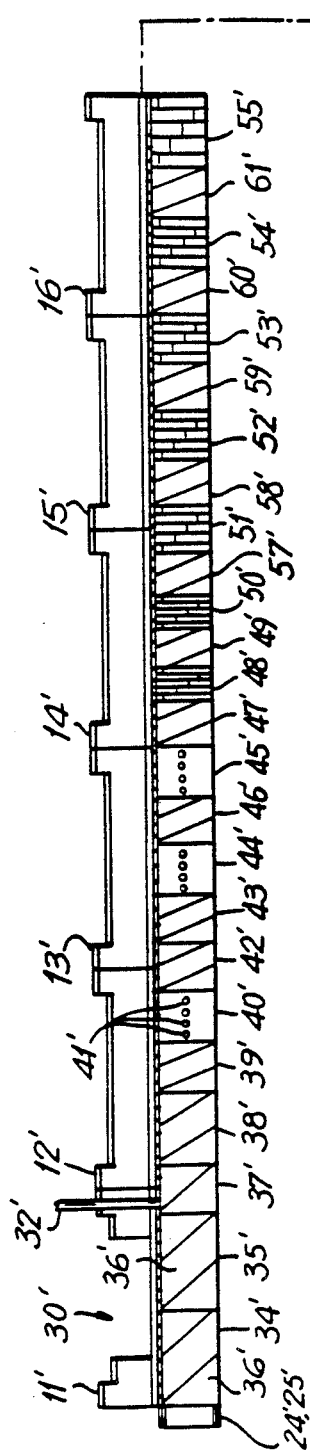
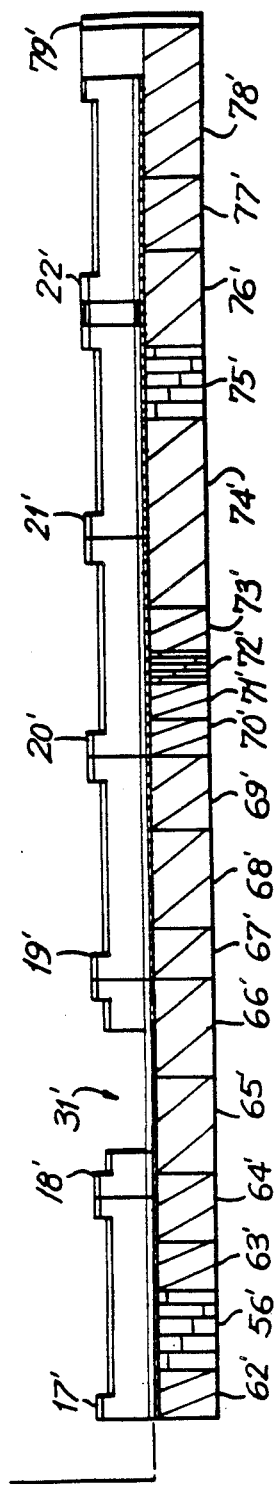
FIG. 6

EXTRUDER AND CONTINUOUS MIXER ARRANGEMENT FOR PRODUCING AN AT LEAST PARTIALLY BAKED PRODUCT HAVING A COOKIE-LIKE CRUMB STRUCTURE INCLUDING A POST-EXTRUSION MICROWAVE DEVICE

FIELD OF THE INVENTION

The present invention is directed to an apparatus for continuously producing an at least partially baked product having a cookie-like crumb structure and, more particularly, to a two stage mixing apparatus including, for example, an extruder and a continuous mixer operating together to at least partially bake, continuously mix and extrude a preselected formulation of ingredients to provide an at least partially baked output product which, upon final baking, exhibits a cookie-like crumb structure. In addition, a microwave device is coupled to the downstream end of the continuous mixer to final bake the output product.

BACKGROUND OF THE INVENTION

An extruder generally comprises a screw-like element rotably mounted within a bore or screw channel formed in a longitudinally extended extruder barrel. The screw-like element includes various thread configurations which may alternate with mixing projections of various shapes and sizes such that the rotation of the screw-like element conveys and mixes ingredients which are fed into the screw channel through an inlet port arranged at the upstream end of the extruder barrel. Typically, an extrusion port or die is mounted at the downstream most end of the extruder barrel whereby the ingredients which have been mixed and conveyed by the rotating screw-like element are forced through the die to provide an output product which comprises a thorough mixture of the ingredients fed through the inlet port of the extruder.

In one advantageous embodiment of an extruder, twin screws are arranged within side-by-side, communicating bores which have a figure eight cross-section. The screw threads and mixing projections of the twin screws intermesh with one another in a self-cleaning action to mix, convey and otherwise mechanically work the various ingredients fed into the inlet port. The dimensions of the communicating bores and elements of the twin screws, as well as the speed of rotation of the twin screws can be designed such that the operation of the extruder introduces high compressive and shearing forces to the ingredients being mixed and conveyed throughout certain sections of the extruder to raise the temperature and thereby heat treat the ingredients during their conveyance through the extruder.

The heat treatment operation of an extruder also depends upon the viscosity of the mixed ingredients being conveyed. Generally, the viscosity must be high enough so that the viscous resistance of the mixture to the shearing and compressive forces introduced by the screw-like element results in sufficient friction to raise the temperature of the mixed ingredients. An extruder may also include a supplemental heat source, such as an electric heater in each barrel section arranged to surround the screw channel, to introduce heat, as for example, by conduction into the ingredients. Such a supplemental heat source could be used when the viscosity of the mixture is not high enough to provide the friction required for heat treatment. The barrel of the extruder may also include tubing for the circulation of, e.g., hot or cold water for additional temperature control of the screw channel. Moreover, a thermostat control can be used to maintain preselected temperatures at certain longitudinal sections or zones of the extruder. The thermostat may, for example, activate the electric heater to raise the temperature when the temperature level of a zone falls below the preselected level and further activate a source of cooling water through the tubing when the temperature level in the zone rises above the preselected level.

Extruders, particularly twin screw extruders, have been used widely in the food industry to continuously mix ingredients to produce a raw dough and also to at least partially cook the ingredients, as they are mixed, to produce a partially or fully cooked food product. Typically, extruders are used to produce cereals, snacks, pet foods and other products which generally are expanded upon extrusion through a die and which have relatively low amounts of oil as a percentage of the total weight of the food product. It has been found, for example, that the presence of oils above certain levels causes processing problems such as surging and product characteristics such as oil separation, which are undesirable. More specifically, upon extrusion, separated oil may appear as a coating on the remaining dough mass or periodically discharge separately from the remaining dough mass. Oil separation may be caused or aggravated by high pressure areas within the extruder as, for example, at the extruder die and within high compressive force zones in a heat treatment section of the extruder. In such areas, the compressive forces literally squeeze the oil from the dough mass.

In particular, it has been found that the use of an extruder to at least partially bake a cookie dough, which typically comprises a formulation including flour, added water and high amounts of both oil and crystalline sugar, may result in oil separation and excessive dissolution of the crystalline sugar. Traditionally, a baked cookie exhibits a crumb structure having structural integrity (i.e. the product does not readily crumble apart). A crumb structure is a significant characteristic which affects the texture of a cookie product. Oil separation caused by the high pressure, high temperature and/or turbulent conditions generated by the extruder, as required to achieve thorough mixing and heat treatment of a product within the extruder, tends to preclude a crumb structure. Moreover, the presence of high amounts of both oil and crystalline sugar with water above a certain level promotes the dissolution of the sugar in the water to increase the relative amount of hydrophilic mass which in turn, tends to cause further oil separation. The dissolved sugar may also result in an excessively hard texture for the final product. For these reasons, extruders have not been heretofore successfully utilized to at least partially bake a cookie dough to produce a final product having a cookie-crumb-like structure with structural integrity.

Conventional cookie production involves forming a cookie dough which is cut into pieces followed by baking of the pieces. Low temperatures, typically at about room temperature, are used to form the dough in a batch process. The low temperature mixing generally avoids separation of oil from hydrophilic dough components. While baking temperatures in a conventional oven, such as a band oven, may promote oil separation, there is no mixing or pressing action performed at the baking temperatures, as occurs in an extruder, to squeeze the oil from the dough mass. Any oil separation which may occur in such ovens does not generally interfere with continuous operability of the cookie production process as it would in a continuous cooker/extruder process.

SUMMARY OF THE INVENTION

It is a primary objective of the present invention to provide an extruder apparatus which is operable in accordance with a novel process as disclosed in copending U.S. application Ser. No. 362,490, now abandoned entitled "Cookie Production With Extrusion, Heat Treatment and Post Extrusion Mixing and Baking", filed on even date herewith, which is hereby expressly incorporated by reference. The process of the co-pending patent is directed to a process to continuously mix and at least partially bake the ingredients of a dough formulation to produce a partially baked output product which, when fully baked, has a cookie-crumb-like structure with structural integrity. Generally, the apparatus of the invention comprises a screw-type extruder, preferably a twin screw extruder, having upstream ingredient inlet ports and a second stage mixing device, such as a continuous mixer, coupled to the downstream end of the extruder and a microwave device coupled to the downstream end of the continuous mixer. The screw configuration of the extruder comprises a novel sequence of conveying, mixing and kneading elements arranged relative to the upstream, inlet ports so that ingredients comprising flour and oil can be input through the upstream inlet ports, conveyed and mixed under conditions to elevate the temperature for heat treatment to partially bake the ingredients comprising flour and oil without the extruder by the barrel sections and the action of screw elements, preferably for substantially the entire length of the extruder.

The partial baking by the extruder of the ingredients comprising flour and oil input through the upstream inlet ports of the extruder with an elimination or significant reduction of added water or a source of added water at the upstream end of the extruder results in a reduction in oil separation from the mass of flour and oil which is sufficient to eliminate surging in the extruder and undesirable product characteristics such as a surface layer of oil on the extruder dough mass. The extruder is generally operated at relatively low pressure to further minimize oil separation.

The viscosity of an oil and flour formulation when admixed in an extruder with a minimal amount or no added water, is too low for viscous resistance heat treatment processing. Generally, if the amount of added water is too low, the extrudate will tend to be slurry-like mass which is not suitable for friction heat treatment within the extruder or for shaping and cutting in post extrusion processing. Thus, a supplemental heat source is used to heat treat the ingredients comprising oil and flour while the screw configuration is designed for vigorous mixing and increasing degree of fill within the free volume of the screw channel to provide an even heat distribution throughout the thoroughly mixed ingredients preferably for substantially the entire length of the extruder.

When added water or a source of added water is provided in the extrudate, the consistency can be modified to provide a mixture having sufficient formability and machinability for shaping and cutting into a final product. As the amount of added water is increased, the extrudate consistency changes to a dough-like elastic mass until a threshold level is reached. At this level, additional water reduces the consistency and further addition of water may result in substantial oil separation and extruder surging.

The introduction of added water in amounts below the threshold level results in the added water mixing with glutens in the flour to provide a mass with elastic properties which is hydrophilic in nature. The elastic hydrophilic mass, while improving the formability and machinability of the formulation, will increase the tendency toward oil separation under certain temperature and pressure conditions.

Consistencies suitable for forming or cutting operations depend upon the particular operation and particular equipment utilized. For example, a consistency which is too high for wire cutting may be suitable for sheeting or rotary molding. For rotary molding, the consistency at about the threshold level is suitable. For extrusion through a die, for producing a sheet for example, or for wire cutting, the consistency should be less than the threshold value. However, to reduce the risk of substantial oil separation in the extruder or in post extrusion forming operations and to reduce post extrusion baking times, it is generally preferred that the amount of water added be less than the amount needed to reach the threshold or maximum consistency. Thus, it is generally preferred that the water content of the dough-like mixture is such that any additional water would further increase the consistency of the dough-like mixture.

If the ratios of the amounts of the other ingredients are kept constant then: the amount of water added which is needed to reach the threshold level of consistency will depend upon the heat treatment of the ingredients. Generally, the longer the heating, or the higher the temperature of heating, the lower is the amount of water needed to reach the threshold level of consistency.

The heat treated mass temperature before and/or during admixing with water or a source of water should be sufficiently low so that the added water does not result in substantial separation of oil and extruder surging. The reduction of the temperature of the heat treated mass substantially reduces mobility and immiscibility of the water and oil phases. Also, it has been observed that the oil is most likely to separate from the remaining mass at the points of highest pressure, such as at the extruder die. Generally, the lower the pressures encountered by the heat treated mass upon or subsequent to the addition of the water, the less the heat treated mass needs to be cooled to avoid substantial oil separation and extruder surging.

If pressures are sufficiently low (such as when an extruder die is not utilized) and if the mass temperature during heat treatment is sufficiently low, little or substantially no cooling may be needed to avoid substantial oil separation or extruder surging. However, higher heat treated mass temperatures are preferred for: (1) the promotion of browning and flavor development, and (2) reduced post extrusion heating times. Thus, it is generally preferred that the heat treated mass be heated to a high temperature and that the heat treated mass temperature be reduced before and/or during admixing it with water or source of water. Cooling of the heat treated mass is preferably initiated prior to and continues during admixing it with water or a liquid source of water to reduce the risk of substantial oil separation upon mixing or extrusion.

Accordingly, at least a substantial portion of the added water is added at an added water inlet arranged in the second stage mixing device for mixing with the partially baked ingredients comprising flour and oil which are extruded from the extruder and fed directly into a dry ingredient inlet port of the second stage mixing device. The second stage mixing device may comprise a continuous mixer which is similar in construction to an extruder except that, for the same screw diameter, a continuous mixer has a greater free volume and operates to mix and convey ingredients at relatively lower pressures and shear than an extruder to obtain a substantially homogeneous output. An extruder can also be used as the second stage mixing device if operated at low temperature and low pressure.

An extruder is preferable as the second stage mixing device when a pressure build up is required for shaping, as for example, through an extrusion die. The extruder also permits an axial exit of the extrudate for unidirectional continuous processing. On the other hand, in a high volume production environment, a continuous mixer is preferred to provide a higher volumetric through put and a better heat transfer from the ingredients for efficient and rapid cooling. A continuous mixer also permits a more efficacious particulate feeding.

A thorough yet gentle mixing by the second stage mixing device of the added water throughout the heat-treated mass at relatively low temperature enables the added water to be dispersed throughout the other cookie ingredients and to modify the consistency of the mass to provide an output product from the second stage mixing apparatus suitable for shaping and cutting. Unacceptable oil separation is avoided due to the relatively low water addition, low temperature and low pressure operation of the second stage mixing device.

Crystalline sugar is added upstream through the extruder input port and/or downstream at the input port of the second stage mixing device.

The relative amount of at least one crystalline sugar or granulated sugar, such as sucrose, which is input through the extruder inlet port with the flour and oil and subjected to the heat treatment, is used to control the tenderness and crunchiness of the final product. More specifically, the addition of a portion of the crystalline sugar to the flour and oil formulation through the extruder inlet port with the added water input through the inlet port of the second stage mixing device, to minimize the dissolution of sugar, tends to promote a crunchy texture to the crumb structure of the final product. Addition of all or a portion of the crystalline sugar through the inlet port of the second stage mixing device, which operates at lower temperature and lower pressure than the first stage extruder, tends to avoid excessive sugar dissolution and promotes a process of the co-pending application, 15%–85% of the total crystalline sugar is added through the extruder inlet port and 15%–85% of the total crystalline sugar is added through the inlet port of the second stage mixing device depending upon the desired crunchiness of the final product.

Moreover, a downstream input of all or a portion of the crystalline sugar through the inlet port of the second stage mixing device reduces the total mass which must be heat-treated by the extruder and facilitates the cooling of the heat-treated mass by adding the relatively cool bulk of the crystalline sugar at the inlet port of the second stage mixing device, the second stage mixing device being operated at lower temperatures.

In this manner, the added water and all or a portion of the crystalline sugar is added to the formulation subsequent to the heat treatment of the other ingredients so that the water does not modify the consistency of the heat treated mass until after the high temperatures of the heat treatment provided by the extruder and, therefore, the extrudate is not exposed to conditions which can cause oil separation or excessive dissolution of the crystalline sugar in the water. This promotes a crumb structure in the final product which is either tender or crunchy, depending upon the level of upstream crystalline sugar addition, but not excessively hard.

The use of substantially the entire maximum available length of the extruder to heat treat the ingredients comprising oil, flour and optionally, the upstream added crystalline sugar permits significant development of Maillard reaction promoters, and flavor promoters and further substantially reduces the amount of post extrusion heat treatment required for final baking of the output product. The temperature of the heat treatment zone is preferably as high as possible for a given throughput rate without deleterious effects on the ingredients. The separation of the heat treatment zone of the first stage extruder from the low temperature operation of the second stage mixing apparatus also eliminates the loss of heat by conduction through the screw shafts and the screw elements inasmuch as the screw shafts of the first and second mixing stages are physically separate from one another.

The output product from the second stage mixing device is a partially baked, homogeneous cookie dough-like mass including added water and crystalline sugar without excessive dissolution of the added crystalline sugar and with a sufficient total water content for forming and shaping. The second stage mixing device, according to the invention, is operated such that the temperature and/or pressure acting upon the food product near the output of the continuous mixer, is sufficiently low so as to prevent oil separation or a flash off of moisture and thereby limit expansion of the product at the output of the continuous mixer. Thus, the cookie-dough-like product output does not crumble apart and remains dough-like in consistency for shaping, cutting and further processing before final baking. The minimal amount of final baking required due to the preferred use of the entire length of the extruder for heat treatment permits the addition of heat sensitive or particulate ingredients to the formulation, for example, through a downstream feed port in the continuous mixer. Shaped or cut pieces of the partially baked output product are leavened and further browned using microwave energy. Pursuant to the invention, the microwave device is coupled to the downstream end of the continuous mixer to final bake the output product.

BRIEF DESCRIPTION OF THE DRAWINGS

FIG. 1 is a side view of an extruder, continuous mixer and microwave device to the present invention.

FIG. 2 is an end cross-section of the extruder taken along line 2—2 of FIG. 1.

FIG. 3 is a top view, partially broken away of the extruder and second stage mixing device of FIG. 1.

FIG. 6 is a schematic representation of an alternative screw configuration for the extruder of FIG. 1.

DETAILED DESCRIPTION

Figure 4:
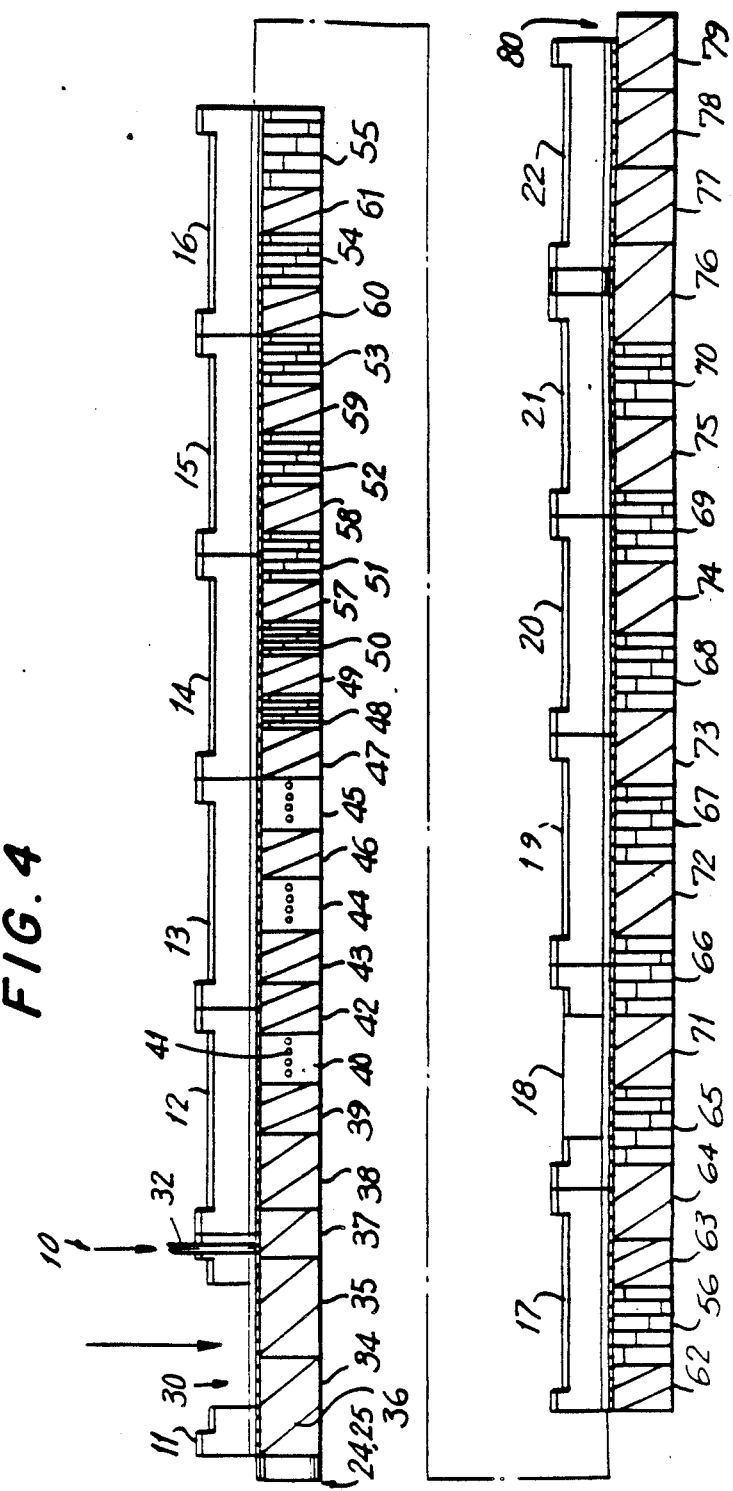
FIG. 4 is a schematic representation of the screw configuration of the extruder of FIG. 1.

Referring now to the drawings and initially to FIG. 1, there is illustrated a side view of an extruder 10 and second stage mixing device 100 arranged according to the present invention. The extruder 10 comprises a plurality of barrel sections, e.g., twelve barrel sections 11-22, (see FIG. 4) each of which includes a figure eight cross-section bore or screw channel 23 formed therethrough (see FIG. 2). The sections 11-22 are fastened end-to-end, to one another with the respective bore sections 23 axially aligned, as is well known, to provide the screw barrel of the extruder 10. A dry ingredient feed port 30 is provided in barrel section 11 for input of, for example, flour and a liquid feed 32 is arranged between barrel sections 11 and 12 for input of oil.

The output end 80 of the extruder 10 is aligned above an inlet feed port 101 of the second stage mixing device 100. Thus, the heat treated ingredients output by the extruder 10 are fed, together with added water, input through a water inlet port 200, directly into the second stage mixing device 100.

Twin screws 24, 25 can be arranged in the extruder 10 in an intermeshing arrangement, to extend through communicating screw channels 26, 27 of the figure eight cross-section bore 23 from one end of the extruder barrel formed by the barrel sections to the other end thereof. The twin screws 24, 25 are coupled to an electric motor 28, arranged adjacent the upstream end of the extruder 10 for rotation within the screw channels 26, 27.

As illustrated in FIG. 1, the extruder 10 is divided into a blending zone and a mixing and heat treatment zone. The mixing and heat treatment zone is preferably arranged to extend along a substantial portion of the length of the extruder 10.

Referring now to FIG. 4, there is illustrated, in schematic form, a specific screw configuration for each of the twin screws 24, 25 of the extruder 10. The illustrated screw configuration is now described as a representative embodiment of the present invention. Each of the screws 24, 25 comprises a series of elements intermeshing with an adjacent identical series of elements of the other screw 24, 25. Screw elements 34, 35, the upstream most elements, are arranged directly beneath the dry ingredient feed port 30. The screw elements 34, 35 each include a continuous screw-like thread 36 to rapidly convey dry ingredients such as flour and a portion of the crystalline sugar into the screw channel 23. Each of the elements 34, 35 comprises an 80/80/SK screw element which indicates that the screw-like thread has a pitch of 80 and that each element is 80 mm in length. The SK designation indicates a shuffle kneader which includes undercut threads to catch and carry dry ingredients as they are input through the dry ingredient feed port 30. The liquid feed port 32 is arranged adjacent the dry ingredient feed port 30 for input of oil. The screw elements 34, 35 generally comprise the blending zone of the extruder 10.

A screw element 37 is arranged immediately downstream from the 80/80/SK elements 34, 35 and comprises an 80/40 screw element (i.e. a pitch of 80 and a length of 40 mm). The screw element 37 is followed immediately by a 60/60 screw element 38 and a 40/40 screw element 39. The progressively shorter, lower pitch screw elements 37, 38, 39 decrease the speed of conveyance to thereby increase the degree of fill of the ingredients within the free volume of the bore 23. Degree of fill refers to the percentage of the free volume of the bore 23 occupied by ingredients being conveyed by the screw elements 24, 25.

An igel element 40, which is 40 mm in length, is arranged immediately downstream from the screw element 39. An igel element includes churning projections 41 to provide a chopping action to the ingredients within the bore 23. The igel element 40 does not itself convey material which causes a further increase in the degree of fill. The through put flow of ingredients through the igel element 40 is caused by the pushing action on the ingredients by the screw elements 34, 35, 37, 38 and 39 upstream from the igel element 40.

Two 40/40 screw elements 42, 43 are arranged immediately downstream from the igel element 40 to continue the conveyance of the ingredients. Two additional 40 mm igel elements 44, 45 are provided downstream from the screw element 43. These igel element elements 44, 45 are spaced from one another by a 40/40 screw element 46. Moreover, an additional 40/40 screw element 47 is arranged immediately downstream from the igel element 45. The igel element elements 44, 45 and screw elements 46, 47 thereby provide alternating elements to chop, convey, chop and convey the ingredients. This sequence gradually increases the degree of fill and churns the ingredients to afford a better mixing of the ingredients.

A first kneading block element 48 is positioned directly downstream from the screw element 47. The kneading block element is used to mix the ingredients and comprises a KB/45/5/20 element. This indicates that it is a kneading block having mixing discs staggered at 45° right hand angles, relative to one another around the axis of rotation of the screw, 5 total discs in the element and the element is 20 mm long.

The kneading element 48 is followed by a 40/40 screw element 49. Thereafter, there is an alternating sequence of kneading block elements 50-56 and interposed screw elements 57-63. Each of the intermediate screw elements 57-63 comprises a 40/40 screw element while the kneading block elements 50-56 comprise, in downstream order, a KB/45/5/20 element (kneading block 50), four KB/45/5/40 elements (kneading blocks 51-54) and two KB/45/5/60 elements (kneading blocks 55-56).

The gradual increase in size of the kneading block elements 50-56 and relatively short, low pitch screw elements 57-63 in-between the successive kneading block elements causes a continuing increase in degree of fill and a vigorous mixing of the ingredients. Immediately downstream from the screw element 63 is a further series of alternating kneading block elements 65-70 with interposed screw elements 64 and 71-75. Each of the screw elements 64, 71-75 comprises a 60/60 screw element and each of the kneading block elements 65-70 comprises a KB/45/5/60 kneading block element. This configuration of alternating kneading block elements 65-70 further vigorously mix the ingredients. The alternating kneading element sequences defined by kneading element 50-56 and 65-70 in barrel sections 14 provide a vigorous mixing zone throughout a substantial portion of the length of the extruder.

Each of the barrel elements 11–22 includes an electrical heating element 500 and cooling water flow tubing 501 to control the temperature of the barrel element (see FIG. 2). Such a temperature controlled barrel element comprises, for example, a model ZSK-57 extruder barrel element manufactured by Werner & Pfleiderer. The viscosity of the ingredients comprising flour and oil is not sufficient for friction heating due to vigorous mixing action of the kneading block elements 50–56 and 65–70. Accordingly, the heating elements 500 of barrel elements 12–22 are operated to raise the temperature of the ingredients. The electrical heating elements 500 of the barrel elements 12–22 are operated to raise the temperature of the barrels to as high as possible, e.g. 50° F., for a given throughput rate to promote Maillard browning and flavor development and to reduce the amount of post extrusion heat treatment required for final baking.

The heated barrel sections 12–22 generally comprise the heat treatment zone of the extruder 10. In this manner, substantially all of the length of the extruder 10 is used for vigorous mixing and heat treating the ingredients comprising flour and oil fed through the inlet feed ports to the extruder 10. Thus, the ingredients fed through the first dry ingredient feed port 30 and first liquid feed port 32 are thoroughly mixed and heat-treated by the overall conveying, churning and mixing action of the screws 24, 25 and heating effect of the barrel sections 12–21. The term "vigorous" as used herein means a mixing action which is sufficient to thoroughly mix the ingredients input through the first dry ingredient feed port 30 including the flour, oil and, optionally, crystalline sugar, and to facilitate distribution of the heat applied by the heating elements throughout the ingredients. In addition, the term relates to increasing the degree of fill to a level accommodating heat conduction from the heating elements through the screw channel 23 and into the ingredients.

Screw elements 76–79 are arranged downstream from the kneading block element 70 and comprise one 80/80 and three 60/60 elements, respectively, to increase the speed of conveyance and transport the ingredients out the open end 80 of the extruder 10.

Figure 5:
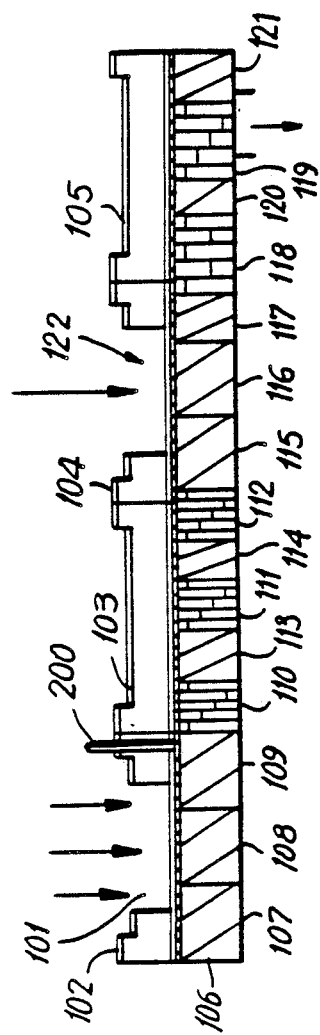
FIG. 5 is a schematic representation of the screw configuration of the second stage mixing device of FIG. 1 wherein the second stage mixing device comprises an extruder.

Referring now to FIG. 5, the second stage mixing device 100 comprises an extruder, which is about 12 l/d and includes four barrel sections 102–105 fastened end-to-end with twin screws (screw 106 illustrated) in a similar manner as the extruder 10. A motor 150 (see FIG. 1) is coupled to the screws for rotation. Relatively high pitch screw elements 107–109, e.g. 120/120 screw elements, are arranged directly below the inlet feed port 101 to rapidly convey the heat treated ingredients comprising oil and flour from the extruder 10, and any added crystalline sugar downstream from feed port 101. The added water is input through the liquid feed port 200. As noted above, the added water modifies the consistency of the mixture to provide an elastic mass having sufficient formability and machinability for post extrusion processing.

The screw elements 107–109 are followed by alternating kneading blocks 110–112 with interposed screw elements 113–114. The screw elements 113–114 are shorter and of lower pitch than the screw elements 107–109, e.g. 80/80 so that, together with the kneading blocks 110–112 (e.g. KB/45/5/80 elements), they act to lower the speed of conveyance and increase the degree of fill to permit thorough mixing of the ingredients by the kneading block elements 110–112 However, the number of alternating kneading block elements is fewer than in the first extruder 10 to provide a gentle lower temperature mixing to avoid oil separation after the addition of the water. The barrel sections 102–105 of the second stage extruder include temperature control means (not shown) which are operated to maintain the barrel sections at lower temperatures than in the barrel sections of the heat treatment zone of the extruder 10 to further prevent oil separation after water addition.

The alternating kneading blocks 110–112 are followed by three screw elements 115–117 of decreasing pitch and length (e.g. two 120/120 element followed by an 80/80 element) to feed the ingredients into final kneading block elements 118–119 (e.g. KB/45/5/100 elements) for final mixing. A screw element 120 (e.g. a 120/60 element) is interposed between the kneading block elements 118, 119 and a final screw element 121 (e.g. an 80/80 element) is arranged downstream from the kneading block elements 118, 119 to output the cookie dough from second stage extruder 100.

A second downstream inlet feed port 122 can be formed in barrel section 104, above the screw elements 115, 116 for input of ingredients such as particulate ingredients, e.g., nuts, chocolate chips etc. and/or heat sensitive ingredients. The screw elements 115–116 increase the speed of conveyance of the ingredients below the second feed port 122, which decreases the degree of fill and facilitates the intake and mixing of the ingredients fed through the inlet port 122 by the kneading block elements 118–119.

Referring now to FIG. 6, there is illustrated, in schematic form, an alternative screw configuration for each of twin screws 24', 25' of the extruder 10. As in the embodiment of FIG. 4, each of the screws 24', 25' comprises a series of elements intermeshing with an adjacent identical series of elements of the other screw 24', 25'. Screw elements 34', 35', the upstream most elements, are arranged directly beneath the first dry ingredient feed port 30'. The screw elements 34', 35' each include a continuous screw-like thread 36' to rapidly convey dry ingredient such as flour and a portion of the crystalline sugar into the screw channel 23'. Each of the elements 34', 35' comprises an 80/80/SK screw element. The first liquid feed port 32' is arranged adjacent the first dry ingredient feed port 30' for input of oil. The screw elements 34', 35' generally comprise the blending zone of the extruder.

A screw element 37' is arranged immediately downstream from the 80/80/SK elements 34', 35' and comprises an 80/40 screw element. The screw element 37' is followed immediately by a 60/60 screw element 38' and a 40/40 screw element 39'. The progressively shorter, lower pitch screw elements 37', 38', 39' decrease the speed of conveyance to thereby increase the degree of fill of the input oil and flour ingredients within the bore 23'.

An igel element 40', which is 40 mm in length, is arranged immediately downstream from the screw element 39'. The igel element 40' includes churning projections 41 to provide a chopping action to the ingredients within the bore 23'.

Two 40/40 screw elements 42', 43' are arranged immediately downstream from the igel element 40' to continue the conveyance of the ingredients. Two additional 40 mm egel elements 44', 45' are provided downstream from the screw element 43'. These igel elements 44', 45' are spaced from one another by a 40/40 screw element 46'. Moreover, an additional 40/40 screw element 47' is arranged immediately downstream from the igel element 45'. The igel elements 44', 45' and screw elements 46', 47' thereby provide alternating elements to chop, convey, chop and convey the ingredients. As in the screw configuration illustrated in FIG. 4, this sequence gradually increases the degree of fill and churns the ingredients to afford a better mixing of the ingredients.

A first kneading block element 48' is positioned directly downstream from the screw element 47'. The kneading block element is used to mix the ingredients and comprises a KB/45/5/20 element.

The kneading element 48' is followed by a 40/40 screw element 49'. Thereafter, there is an alternating sequence of kneading block elements 50'-56' and interposed screw elements 57'-63'. Each of the intermediate screw elements 57'-63' comprises a 40/40 screw element while the kneading block elements 50'-56' comprise, in downstream order, a KB/45/5/20 element (kneading block 50'), four KB/45/5/40 elements (kneading blocks 51'-54') and two KB/45/5/60 elements (kneading blocks 55'-56',).

The gradual increase in size of the kneading block elements in size of the kneading block elements 50'-56' and relatively short, low pitch screw elements 57'-63' in-between the successive kneading block elements causes a continuing increase in degree of fill and a vigorous mixing of the ingredients. Thus, the kneading block elements 50'-56' in barrel sections 14'-17' comprise a vigorous mixing zone.

Each of the barrel elements 11'-22' includes heating elements 500 and cooling water flow tubing 501 as shown in FIG. 2 to control the temperature of the barrel element. Such a temperature controlled barrel element comprises, for example, a model ZSK-57 extruder barrel element manufactured by Werner & Pfleiderer. The electrical heating elements of barrel elements 12'-22' are operated to raise the temperature of the ingredients. The heating elements of the barrel elements 12'-22' are operated to raise the temperature of the barrels to as high as possible, e.g. at least 350° F., for a given throughput rate to promote Maillard browning and flavor development and to reduce the amount of post extrusion heat treatment required for final baking.

Thus, the ingredients fed through the first dry ingredient feed port 30' and first liquid feed port 32' are thoroughly mixed and heat-treated by the overall conveying, churning and mixing action of the screws 24', 25' in barrel sections 14'-17' and the heating effect of the barrel sections 12'-22'. The barrel sections 12'22'-22' generally comprise the heat treatment zone of the extruder 10 which extends throughout substantially the entire length of the extruder 10. The vigorous mixing occurs in barrel sections 14'-17'.

Immediately downstream from the last screw element 63' of the alternating screw and kneading block elements is a conveyance zone comprising a series of screw elements 64'-68' of generally increasing length and screw pitch. The conveyance zone is for the optional addition of crystalline sugar into the heat treatment zone to control texture and crunchiness of the final product. Thus, crystalline sugar can optionally be added downstream from the feed port 30' to reduce the exposure of the sugar to full heat treatment as a further control over the crunchiness of the cookie texture. As illustrated in FIG. 6, the series of screw elements 64'-68' are located in barrel sections 17', 18' and 19'. Barrel section 18' can include a feed port 31' which can be opened or closed depending upon whether crystalline sugar is to be added into the conveyance zone.

The screw elements 64'-68' comprise 60/60, 80/80/SK, 80/80/SK, 80/40 and 80/80 screw elements, respectively, which increases the speed of conveyance of the heat treated ingredients.

Screw elements 69'-71' are arranged downstream from the screw elements 64'-68' and comprise one 60/60 and two 30/30 elements, respectively, to reduce the speed of conveyance and again gradually increase the degree of fill. A kneading block element 72', which comprises a KB/45/5/20 element, is provided downstream from the screw elements 69'-71' to further mix the ingredients including any optional sugar fed into the conveyance zone defined by the screw elements 64'-68'.

Two additional screw elements 73', 74', which comprise a 40/10 and 80/160 element, respectively, convey the ingredients to a final kneading block element 75', which comprises a KB/45/5/60 element for final mixing of the ingredients. The kneading block elements 72', 75' provide the final mixing zone of the extruder.

The final elements of the twin screws 24', 25' comprise screw elements 76'-78', which include an 80/80, a 60/60 and a 60/120 element, respectively. These elements convey the ingredients to the inlet port of the second state mixing device 100.

Figure 7:
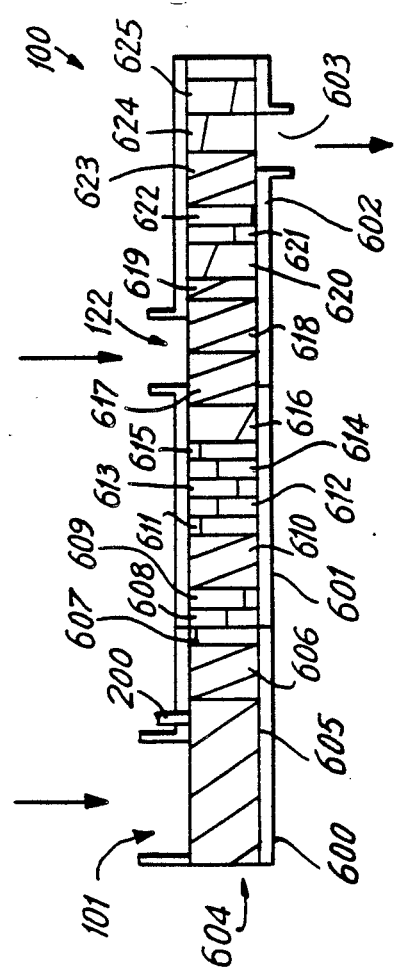
FIG. 7 is a schematic representation of the screw configuration of the second stage mixing device of FIG. 1 wherein the second stage mixing device comprises a continuous mixer.

Referring now to FIG. 7, there is illustrated in schematic form, a screw configuration for a second stage mixing device 100 which comprises a continuous mixer. The continuous mixer 100 includes three barrel sections 600-602 with the dry ingredient inlet port 101 and added water feed port 200 arranged in barrel section 600, the downstream inlet port 122 in barrel section 602 and a vertical output opening 603 in barrel section 602. The continuous mixer is a twin screw arrangement with one of the two identical screws 604 illustrated in FIG. 7. Each of the screws includes 21 elements as set forth in the following table:

| Element No. (FIG. 7) | Length (in mm) | Element Type |
| --- | --- | --- |
| 605 | 270 | single lobe conveying element |
| 606 | 90 | double lobe conveying element |
| 607 | 30 | kneading disc |
| 608 | 30 | kneading disc - 30° right hand staggered relative to kneading disc 607 |
| 609 | 30 | kneading disc - 30° right hand staggered relative to kneading disc 608 |
| 610 | 90 | double lobe conveying element |
| 611 | 30 | kneading disc |
| 612 | 30 | kneading disc - 30° right hand staggered relative to kneading disc 611 |
| 613 | 30 | kneading disc - 30° right hand staggered relative to kneading disc 612 |
| 614 | 30 | kneading disc - 30° left hand staggered relative to kneading disc 613 |
| 615 | 30 | kneading disc - 30° left hand staggered relative to kneading disc 614 |

-continued

| Element No. (FIG. 7) | Length (in mm) | Element Type |
|---|---|---|
| 616 | 60 | kneading disc with pitch (for conveying effect) - 30° right hand staggered relative to kneading block 615 |
| 617 | 90 | double lobe conveying element |
| 618 | 90 | double lobe conveying element |
| 619 | 90 | double lobe conveying element |
| 620 | 60 | kneading disc with pitch |
| 621 | 30 | kneading disc - 30° right hand staggered relative to element 620 |
| 622 | 30 | kneading disc - 30° right hand staggered relative to element 621 |
| 623 | 90 | double lobe conveying element |
| 624 | 60 | kneading disc with pitch |
| 625 | 60 | kneading disc with pitch 30° right hand staggered relative to element 620 |

The single lobe screw element 605 rapidly conveys the heat treated ingredients comprising flour and oil from the extruder 10 together with any crystalline sugar input through the feed port 101 and the added water fed into the screw channel of the continuous mixer 100.

The various kneading discs 607-609, 611-616, and 621, 622 with intermediate double lobe conveying elements 606, 610, 617, 618, 619 and 623 gently mix and convey the dough-like mass including added water toward the vertical output opening 603. The left hand staggering of kneading discs 614, 615 reduces the rate of conveying within the kneading discs 612-615 to increase the amount of mixing. The kneading discs with pitch 616, 620 both mix and convey the ingredients.

The downstream inlet port 122 is arranged above the screw elements 617, 618 which provide a conveyance zone within the continuous mixer for rapid intake of particulate materials which may be input through the port 122.

The double lobe conveying element 623 is arranged partially above the vertical output opening 603 to convey the dough-like mass toward and out of the continuous mixer 100. The kneading discs with pitch 624, 625 tend to dump the ingredients fed by the double lobe screw element 623 out the opening 603.

The barrel sections 600-602 include cooling jackets for water flow. A cooling water flow is pumped through the jackets in barrel sections 600-602 to reduce and adjust dough temperature during the gentle mixing and conveying of the dough-like mass by the continuous mixer.

Referring once again to FIG. 1, a wire cutter 201 or other suitable device is arranged adjacent the downstream end of the continuous mixer 100 to cut individual cookie products from the output of the continuous mixer 100. These products are dropped onto a conveyor 300 which transports the material into a microwave device 301 for final baking.

The products are exposed to microwave energy for approximately one minute to provide the final baked cookie product. The heating of the pieces of the output product in a microwave oven 301 is performed so that proper leavening and browning is achieved. The heating of the pieces or cookie preforms in the microwave oven 301 coupled to the downstream end of the continuous mixer 100, should be sufficient to result in an internal temperature of at least about 160° F., more preferably at least about 190° F. in the cookies. The microwave energy may be applied at atmospheric pressure, above atmospheric pressure or under vacuum.

The following table illustrates the basic ingredients for a cookie dough and representative and preferred ranges of each ingredient as a percentage of the total weight of the dough:

| Ingredient | Representative Range | Preferred Range |
|---|---|---|
| Flour (about 12% water by weight) | 30%-70% | 45%-55% |
| Water (including water content of the flour) | <20% | <15% |
| Oil (shortening or fat) | 12%-40% | 15%-30% |
| Sucrose (crystalline sugar) | 10%-40% | 15%-30% |

As discussed above, the flour and oil are input through the dry ingredient port 30 (or 30') and liquid feed 32 (or 32'), respectively, of the extruder 10, and are to vigorous mixing (in barrel sections 14-21 (FIG. 4) or 14'-17' (FIG. 6)) and heat treatment in barrel sections 12-22 (or 12'-22'). The added water, i.e., for example, from about 0.5% weight to about 10% weight of the total dough mix, is input through the liquid feed port 200 of the second stage mixing device 100. The total water of, e.g., <20% and preferably <15% by weight is therefore not provided until after the vigorous mixing and heat treatment of the ingredients comprising flour and oil to minimize oil separation. The added water input through the liquid feed port 200 is gently mixed generally at low temperatures with the heat treated ingredients in the second stage mixing device 100 to provide the dough mass consistency required for forming and cutting.

The consistency of the extrudate can be determined by measuring the force needed to penetrate a sample at a constant rate of penetration. An Instron Texture Analyzer Model 4202 can be used to determine the modulus of the sample, which is a measurement of the consistency of the sample. The modulus is the slope, in the linear region, of a plot of the strain or deformation (x-axis) versus the stress (y-axis). he strain can be measured in inches and the stress can be measured in lbs force. A cylindrical shaped probe having a diameter of 4 mm can be used for the measurement of the consistency. The probe can be set to penetrate the sample at a constant speed of 0.2 inches/min. The sample may comprise a 1 inch square piece which is ¼ inch thick and the sample temperature can be room temperature (about 70°-75° F.) or higher. The more force required to penetrate the sample, the greater is its modulus and the greater is its consistency.

The crystalline sugar is added either through the dry ingredient feed port 101 of the second stage mixing device 100 or partially through the dry ingredient feed port 101 of the second stage mixing device 100 and partially through the dry ingredient feed port 30 of the extruder 10. A portion of the upstream crystalline sugar can also be added through the feed port 31' in barrel section 18' of the extruder illustrated in FIG. 6. The ratio of upstream to downstream sugar addition is preferably 15% to 85% of the total crystalline sugar through each of the dry ingredient feed ports 30, 101 (or 30', 31' and 101). The crystalline sugar added in the extruder 10 is subjected to vigorous mixing and heat treatment and will tend to provide a crunchy texture to the final product. The amount of crystalline sugar added to the extruder 10 will be a function of the desired crunchiness of the final product. The upstream added crystalline sugar will not undergo excessive dissolution to provide a hard texture to the final product or contribute to oil separation during heat treatment processing because the total water of the mixture prior to the addition of the added water in the second stage mixing device 100 is not sufficient to dissolve a substantial amount of the crystalline sugar added to the extruder 10.

The crystalline sugar added in the second stage mixing device 100 is advantageous in providing a tender texture for the final product. Moreover, the bulk of the crystalline sugar added in the second stage mixing device 100 is not heat treated which enables the attainment of a higher product temperature for the ingredients which are input through the dry ingredient feed port 30 (or 30') of the extruder 10 and subjected to heat treatment for a given throughput rate for substantially the entire length of the extruder 10. The crystalline sugar in the second stage mixing device 100 is also relatively cool and provides a cooling mass to the heat treated ingredients to lower the temperature of the ingredients just prior to the input of the added water through the liquid feed port 200 and thereby reduce the possibility of oil separation upon the introduction and mixing of the added water.

The flour may be replaced in whole or in part by flour substitutes or bulking agents including bran. Other ingredients may also be added to the formulation such as emulsifiers, sources of protein, a leavening agent and other ingredients conventionally employed in cookies. Heat sensitive ingredients and particulate ingredients may also be added downstream from the heat treatment and vigorous mixing zones of the extruder. If aspartame is added, a bulking agent such as a grain bran can be used to replace all or a portion of the crystalline sugar. Sugar in liquid form or other sweeteners may also be used with or in place of the crystalline sugar.

The following are examples of the operation of the extruder and second stage mixing device built in accordance with the present invention and operated to mix and heat treat a dough formulation having a cookie-like crumb structure upon final baking.

EXAMPLE I

The below listed ingredients were fed to the extruder 10 and continuous mixer 100 (FIG. 7) to provide a product formulation having the final percentages by weight of the output product (including where each ingredient is fed to the extruder and/or continuous mixer):

| Formulation Mix | % wt of Final Output Product | Addition |
|---|---|---|
| Wheat flour, bleached (about 12% by weight water) | 50.19% | extruder dry feed port 30 |
| Non-fat Dry Milk (about 52% by weight lactose) | 1.51% | extruder dry feed port 30 |
| Salt | 0.75% | extruder dry feed port 30 |
| White sugar (sucrose), granulated | 15.82% | continuous mixer dry inlet port 101 |
| Brown sugar (about 89% sucrose, 3% invert, 4% non-sugar solids 3% water) | 7.38% | continuous mixer dry inlet port 101 |
| Soybean spray oil | 22.53% | extruder liquid feed port 32 |
| Tap Water | 0.81% | continuous mixer liquid feed port 200 |
| Sodium bicarbonate | 1.01% | continuous mixer dry inlet feed port 101 |

The extruder comprised a Werner & Pfleiderer ZSK-57 extruder including twelve barrel sections, each including a heating element and cooling means, and twin screws, each having a screw configuration according to the invention, as illustrated in FIG. 6. The extruder was also arranged to have upstream dry ingredient and liquid feed ports 30', 32' as described above.

The first barrel 11', which contains the first dry feed port 30', was set on constant cool to obtain an actual barrel temperature of less than about 100° F. The remaining eleven barrels were divided into 7 separately measured barrel temperature zones. Barrels 12, and 13' corresponded to temperature zone 1, barrel 14' corresponded to zone 2, barrels 15' and 16' corresponded to zone 3, barrel 17' corresponded to temperature zone 4, barrel 18' corresponded to temperature zone 5, barrels 19' and 20' corresponded to zone 6 and barrels 21' and 22' corresponded to zone 7. Barrels 12' through 22' were set to heat to 300° F. As illustrated in FIG. 2, temperature probes TB and Tp were inserted into the various barrel sections of the temperature zones to measure barrel temperature and product temperature, respectively.

The ingredients were treated at temperatures above the minimum gelatinization temperature of the starch (assuming that a sufficient amount of water was available for reaction with the starch) but no or substantially no gelatinization (measured by differential scanning calorimetry) occurred. It is believed that the oil sufficiently coated the starch containing flour particles to prevent substantial penetration of moisture into the starch granules so as to avoid substantial gelatinization.

The continuous mixer comprised a twin screw Werner and Pfleiderer ZPM-120 equipped with a screw configuration as illustrated in FIG. 7. The continuous mixer had three barrel sections 600–602 fastened end-to-end, each provided with external jacketed heating and cooling means. The dry feed port was set up at barrel 600 of the mixer and was open to the atmosphere. The liquid feed port 200 was the same as the dry feed port 101 at barrel 600. The added water feed inlet pipe was inserted into the open port at barrel 600 so that the dry feed ingredients and the liquid feed ingredients, i.e. tap water, were separately fed into the same open port.

An additional dry feed port 122, open to the atmosphere, was formed in barrel 602 for input of shear sensitive and/or heat sensitive ingredients such as particulate ingredients, e.g., nuts, chocolate chips etc. The screw sections 617, 618 below the dry feed port 122 increase the speed of conveyance of the ingredients which decreases the degree of fill and facilitates the intake and mixing of particulate materials by the kneading blocks in barrel 602.

The extruder screws 24', 25' were rotated at about 130 rpm at about 1% of maximum torque. The mixer screws were rotated at about 60 rpm at about 19% of maximum torque. The ingredients were fed in their relative amounts to provide a throughput or mass flow rate of the dough-like mixture extrudate from the continuous mixer of about 297 lbs/hrs.

The flour, non-fat dry milk and salt was prepared by mixing these ingredients to obtain a substantially homogeneous dry blend. The dry blend was continuously fed to the dry feed port 30' of the extruder 10. The white and brown sugar was prepared by mixing the sugar ingredients to obtain a second substantially homogeneous dry blend which is continuously fed downstream to the inlet dry feed port 101 of the continuous mixer. The oil was prepared by melting semi-solid soybean spray oil to obtain a liquid oil which was continuously fed to the liquid feed port 32' of the extruder. Tap water was continuously fed to the liquid feed port 200 of the continuous mixer. The sodium bicarbonate was continuously fed to the dry feed port 101 of the continuous mixer.

On a calculated basis, the water content of the dough-like mixture formed in the continuous mixer was about 7.1% by weight, based upon the total weight of the dough-like mixture.

At steady state, the barrel set temperatures for the extruder were:

| Barrel # | Barrel Set Temperature, °F. | Actual Barrel Temperature, °F. |
| --- | --- | --- |
| 11' | cool | cool |
| 12' | 300 | 271 |
| 13' | 300 | — |
| 14' | 300 | 268 |
| 15' | 300 | 300 |
| 16' | 300 | — |
| 17' | 300 | 299 |
| 18' | 300 | 269 |
| 19' | 300 | 265 |
| 20' | 300 | — |
| 21' | 300 | 300 |
| 22' | 300 | — |

Tap water is passed through the cooling jackets of the barrels of the continuous mixer to cool the heat treated mass from the extruder while admixing it with the other ingredients fed to the continuous mixer.

The pressure in the extruder and in the continuous mixer was less than about 10 bars. The average or median residence time of the ingredients heated in the extruder was about 60-90 seconds. The average or median residence time of the ingredients in the continuous mixer from the second feed ports was about 60 to 180 seconds.

The heat treated mass formed in the extruder was extruded without a die to obtain a slurry-like substantially homogeneous heat treated mass. The heat treated mass was permitted to fall into the dry ingredient feed port of the continuous mixer. The extrudate temperature upon exiting the extruder was about 201° F. The substantially homogeneous dough-like mixture formed in the continuous mixer was extruded from the mixer without a die to obtain a substantially unleavened extrudate. The dough-like mixture upon exiting the continuous mixer had temperature of about 130° F. The dough-like mixture was immediately transferred to an auger fed wire-cutting machine and cut into pieces while hot. The diameter of each of the pieces was about 1 inch.

Eight pieces were subjected to microwaving in a microwave oven for about 70 seconds to produce distinctly leavened cookies. The cookies were browned and had a crumb-like structure and crumb-like texture.

EXAMPLE II

The below listed ingredients may be fed to the extruder and second stage extruder 100 to provide a product formulation having the final percentages by weight of the output product (including where each ingredient is fed to the extruder and/or continuous mixer):

| Formulation Mix | % wt of Final Output Product | Addition |
| --- | --- | --- |
| Wheat flour, bleached (about 12% by weight water) | 50.19% | extruder dry feed port 30 |
| Non-fat Dry Milk (about 52% by weight lactose) | 1.51% | extruder dry feed port 30 |
| Salt | 0.75% | extruder dry feed port 30 |
| White sugar (sucrose), granulated | 15.82% | second stage extruder dry inlet port 101 |
| Brown sugar (about 89% sucrose, 3% invert, 4% non-sugar solids 3% water) | 7.38% | second stage extruder dry inlet port 101 |
| Soybean spray oil | 22.53% | extruder liquid feed port 32 |
| Tap Water | 0.81% | second stage extruder liquid feed port 200 |
| Sodium bicarbonate | 1.01% | second stage extruder dry inlet feed port 101 |

The extruder may comprise a Werner & Pfleiderer ZSK-57 extruder including twelve barrel sections, each including a heating element and cooling means, and twin screws, each having a screw configuration according to the invention, as illustrated in FIG. 4. The extruder can be arranged to have upstream dry ingredient and liquid feed ports, as described above.

The second stage mixing device may comprise a second stage extruder which may be a Werner & Pfleiderer continual series type extruder equipped with a screw configuration as illustrated in FIG. 5. The second stage mixing extruder may have four barrel sections fastened end-to-end, each provided with external jacketed heating and cooling means. The dry feed port 101 may be set up at barrel section 102 of the second stage extruder and arranged to be open to the atmosphere. The added water feed port 200 may be the same as the second dry feed port at barrel 102. The added water feed inlet pipe may be inserted into the open pot at barrel section 132 so that the dry feed ingredients and the liquid feed ingredients, i.e. tap water, are separately fed into the same open port.

An additional dry feed port 122, open to the atmosphere, may be formed in barrel section 104 for input of shear sensitive and/or heat sensitive ingredients such as particulate ingredients, e.g., nuts, chocolate chips etc. The screw sections below the dry feed port 122 increase the speed of conveyance of the ingredients which decreases the degree of fill and facilitates the intake and mixing of particulate materials by the kneading blocks in barrel section 105.

The extruder screws 24, 25 may be rotated at about 130 rpm at about 1% of maximum torque. The second stage extruder screws may be rotated at about 60-100 rpm at a torque below 20% of the maximum torque of the extruder. The ingredients may be fed in their relative amounts to provide a throughput or mass flow rate of the dough-like mixture extrudate from the second stage extruder 100 of about 297 lbs/hrs.

The flour, non-fat dry milk and salt may be prepared by mixing these ingredients to obtain a substantially homogeneous dry blend. The dry blend may be continuously fed to the dry feed port of the extruder. The white and brown sugar may be prepared by mixing the sugar ingredients to obtain a second substantially homogeneous dry blend which may be continuously fed downstream to the inlet dry feed port 101 of the second stage extruder 100. The oil may be prepared by melting semi-solid soybean spray oil to obtain a liquid oil which may be continuously fed to the liquid feed port 32 of the extruder 10. Tap water may be continuously fed to the liquid feed port 200 of the second stage extruder 100. The sodium bicarbonate may be continuously fed to the dry feed port 101 of the second stage extruder 100.

On a calculated basis, the water content of the dough-like mixture formed in the continuous mixer should about 7.1% by weight, based upon the total weight of the dough-like mixture.

At steady state, the barrel set temperatures for the extruder 10 may be:

| Barrel # | Barrel Set Temperature, °F. |
| --- | --- |
| 11 | cool |
| 12 | 300 |
| 13 | 300 |
| 14 | 300 |
| 15 | 300 |
| 16 | 300 |
| 17 | 300 |
| 18 | 300 |
| 19 | 300 |
| 20 | 300 |
| 21 | 300 |
| 22 | 300 |

Tap water may be passed through the cooling jackets of the barrel sections of the second stage extruder 10 to cool the heat treated mass from the extruder 10 while admixing it with the other ingredients fed to the second stage extruder 100.

The pressure in the extruder and in the second stage extruder should be less than about 10 bars. The average or median residence time of the ingredients heated in the extruder should be about 50-90 seconds. The average or median residence time of the ingredients in the second stage extruder 100 from the second feed ports should be about 60 to 180 seconds.

The heat treated mass formed in the extruder may be extruded without a die to obtain a slurry-like substantially homogeneous heat treated mass. The heat treated mass may be permitted to fall into the dry ingredient feed port 101 of the second stage extruder 100. The extrudate temperature upon exiting the extruder should be about 201° F. The substantially homogeneous dough-like mixture formed in the second stage extruder 100 mixer may be extruded from the second stage extruder 100 without a die to obtain a substantially unleavened extrudate. The dough-like mixture upon exiting the second stage extruder 100 have a temperature of about 130° F. The dough-like mixture may be immediately transferred to an auger fed wire-cutting machine and cut into pieces while hot. The diameter of each of the pieces should be about 1 inch.

Eight pieces may be subjected to microwaving in a microwave oven for about 70 seconds to produce distinctly leavened cookies. The cookies should be browned and have a crumb-like structure and crumb-like texture.

What is claimed is:

1. An apparatus for producing a product having a cookie-like crumb structure, which comprises an extruder including a housing having a screw channel formed along the longitudinal axis of the housing;

at least one screw-type element rotatably received within the screw channel to convey and mix ingredients;

a feed port means arranged in the housing adjacent the upstream end thereof to input ingredients into the screw channel for conveyance and mixing by the screw-type element;

means for inputting at least certain ingredients of a cookie-like dough formulation, including oil and flour, with less than a preselected total water content, by weight, of the ingredients;

the means for inputting being coupled to the feed port means;

a vigorous mixing zone formed by the screw channel and screw-type element downstream from the feed port means to vigorously mix and convey the ingredients input into the feed port means;

a temperature control means operating to elevate the temperature of the screw channel for heat treatment of the ingredients input into the feed port means in a heat treatment zone of the housing extending downstream from the feed port means;

a second stage mixing apparatus including an inlet port coupled to the downstream end of the extruder housing to receive, mix and convey the heat treated ingredients conveyed through the extruder;

an added water inlet port arranged in the second stage mixing apparatus;

a source of water coupled to the added water inlet port to add a preselected amount of water through the added water inlet port to increase the water content and modify the consistency of the heat treated ingredients from the extruder input into the inlet port of the second stage mixing apparatus;

a mixing zone formed by the second stage mixing apparatus and operating to mix the added water throughout the heat treated ingredients under pressure and temperature conditions to avoid substantial oil separation from the heat treated ingredients and added water; and an output means at the downstream most end of the second stage mixing apparatus; and a microwave device coupled to the output means of the continuous mixing apparatus to receive and further heat treat the ingredients output by the output means of the continuous mixing apparatus.

2. The apparatus of claim 1 wherein the vigorous mixing zone extends for substantially the entire length of the housing.

3. The apparatus of claim 1 wherein the heat treatment zone extends for substantially the entire length of the housing.

4. The apparatus of claim 1 wherein the inlet port and added water inlet port are arranged at the upstream most end of the second stage mixing apparatus.

5. The apparatus of claim 1 wherein the second stage mixing apparatus comprises an extruder.

6. The apparatus of claim 1 further comprising a downstream dry ingredient feed port in the second stage mixing apparatus 7. The apparatus of claim 1 wherein the screw-type element comprises a sequence of elements including, in downstream order, a shuffle kneader, an alternating sequence of screw elements and igel elements followed by an alternating sequence of screw elements and kneading block elements, the sequence of elements operating to vigorously mix and convey the ingredients input through the feed port means, prior to input of the added water in the second stage mixing apparatus, the sequence of elements together with the screw channel comprising the vigorous mixing zone.

8. The apparatus of claim 7, wherein the second stage mixing apparatus includes at least one screw-type element which comprises a sequence of elements including, in downstream order, an alternating sequence of screw elements and kneading elements to mix and convey the ingredients input into the second stage mixing apparatus at low pressure and low temperature, relative to the vigorous mixing and heat treatment zones of the extruder.

9. The apparatus of claim 1 wherein the feed port means of the extruder comprises a dry ingredient feed port adjacent to a liquid feed port.

10. The apparatus of claim 1 wherein the extruder comprises a twin-screw extruder.

11. The apparatus of claim 1 wherein the second stage mixing apparatus comprises a continuous mixer.

12. The apparatus of claim 11 wherein the continuous mixer comprises a twin screw continuous mixer.

13. The apparatus of claim 1 further comprising a means for inputting crystalline sugar coupled to the inlet feed port of the second stage mixing apparatus.

14. The apparatus of claim 13 wherein a screw-type element of the second stage mixing apparatus forms a high speed conveyance zone beneath the inlet feed port of the second stage mixing apparatus for rapid intake of the crystalline sugar into the continuous mixing apparatus.

15. The apparatus of claim 1 wherein the temperature control means comprises an electric heating element means arranged in the housing to apply heat to the screw channel.

16. The apparatus of claim 15 wherein the temperature control means further comprises a cooling water flow means arranged around the screw channel to reduce the temperature of the screw channel.

17. The apparatus of claim 16 wherein the temperature control means includes a thermostat control to selectively activate the electric heating element means and cooling water flow means to control the temperature of the screw channel.

18. A two-stage mixing apparatus which comprises:
a housing including a screw channel formed along the longitudinal axis of the housing;
at least one screw-type element rotatably received in the screw channel for conveyance and mixing of ingredients;
a feed port means arranged in the housing at the upstream end thereof to input ingredients into the screw channel for conveyance and mixing by the screw-type element;
a temperature control means operating to elevate the temperature of the screw channel along a preselected portion of the screw channel;
the screw-type element being configured to provide a vigorous mixing and conveying action on ingredients input through the feed port means;
the housing having an output means;
a second stage mixing apparatus coupled to the output means to receive ingredients from the housing;
an added water inlet port arranged in the second stage mixing apparatus;
a source of water coupled to the added water inlet port; and
the second stage mixing apparatus operating to apply a gentle mixing and conveying to the ingredients received from the housing and the added water; and
a microwave device coupled to the output means of the extruder to receive and heat treat the ingredients output by the output means of the continuous mixing apparatus.

* * * * *